(12) United States Patent
Saini et al.

(10) Patent No.: US 11,136,197 B2
(45) Date of Patent: Oct. 5, 2021

(54) CARRIER-BASED SEMI-AUTOMATED CARGO HANDLING SYSTEM

(71) Applicant: Goodrich Corporation, Charlotte, NC (US)

(72) Inventors: Mohinder Saini, Karnataka (IN); Pankajkumar Manilal Patel, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 321 days.

(21) Appl. No.: 16/424,013

(22) Filed: May 28, 2019

(65) Prior Publication Data

US 2020/0223639 A1  Jul. 16, 2020

(30) Foreign Application Priority Data

Jan. 14, 2019 (IN) .............................. 201911001634

(51) Int. Cl.
| | |
|---|---|
| *B65G 13/06* | (2006.01) |
| *B65G 39/18* | (2006.01) |
| *B64C 1/22* | (2006.01) |
| *B64D 9/00* | (2006.01) |

(52) U.S. Cl.
CPC ............... *B65G 39/18* (2013.01); *B64C 1/22* (2013.01); *B64D 9/00* (2013.01); *B65G 13/06* (2013.01); *B64D 2009/006* (2013.01); *B65G 2201/0264* (2013.01)

(58) Field of Classification Search
CPC ............ B65G 13/06; B65G 39/18; B64C 1/22
USPC .................... 198/619, 620; 244/118.1, 137.1
See application file for complete search history.

(56) References Cited

U.S. PATENT DOCUMENTS

| | | | | | |
|---|---|---|---|---|---|
| 3,709,450 | A | * | 1/1973 | Watts | B64D 9/00 410/79 |
| 5,020,445 | A | * | 6/1991 | Adams, Jr. | B60T 17/043 105/159 |
| 7,097,024 | B2 | * | 8/2006 | Swoboda | B62D 65/18 104/290 |
| 7,118,314 | B2 | * | 10/2006 | Zhou | B65D 19/0034 410/84 |
| 7,988,398 | B2 | * | 8/2011 | Hofmeister | H01L 21/67161 414/217 |
| 8,616,564 | B2 | * | 12/2013 | Takehara | B62B 5/0093 280/79.11 |

(Continued)

*Primary Examiner* — Douglas A Hess
(74) *Attorney, Agent, or Firm* — Cantor Colburn LLP (57) ABSTRACT

A cargo handling system (CHS) is provided and includes a guide tray along which an electric rail extends and a carrier movably disposable within the guide tray. The carrier includes a carrier surface, guide and contact rollers for establishing electric communication with the electric rail with the carrier movably disposed within the guide tray, drivable elements to assume retracted or extended positions at which, with the carrier movably disposed within the guide tray, the carrier surface is deployed within or above the guide tray, respectively; and a control system. The control system is configured to draw current from the electric communication between the electric rail and the contact roller and to use the current to operate the drivable elements to move the carrier along the guide tray and to control extension and retraction of the drivable elements.

20 Claims, 4 Drawing Sheets

(56) References Cited

U.S. PATENT DOCUMENTS

| | | | |
|---|---|---|---|
| 8,827,071 B2* | 9/2014 | van de Loecht | B65G 17/12 |
| | | | 198/805 |
| 9,394,114 B2* | 7/2016 | Hanisch | B65G 43/02 |
| 10,351,242 B2* | 7/2019 | Harden | B64D 9/00 |
| 10,421,626 B2* | 9/2019 | Gu | B65G 54/02 |
| 10,723,563 B2* | 7/2020 | Gu | B65G 35/06 |
| 2015/0144462 A1* | 5/2015 | Weiss | |

\* cited by examiner

CARRIER-BASED SEMI-AUTOMATED CARGO HANDLING SYSTEM

CROSS REFERENCE TO RELATED APPLICATION

This application claims the benefit of Indian Patent Application No. 201911001634, filed Jan. 14, 2019, which is incorporated herein by reference in its entirety.

BACKGROUND

The following description relates to a cargo handling system and, more particularly, to a carrier-based semi-automated cargo handling system.

A typical cargo handling system (CHS) can be deployed in an aircraft in order to move luggage contained in unit load devices (ULDs) from an area adjacent to a doorway to another area or a non-doorway area that is remote from the doorway. The typical CHS can include power drive units (PDUs) to provide the power required to move the ULDs and rollers in the non-doorway areas to facilitate the motion of the ULDs. The typical CHS can be relatively heavy and often requires frequent maintenance due to its relative high numbers of rollers and PDUs.

In some cases, the numbers of PDUs in a given CHS can exceed the CHS' requirement for PDUs for certain flights that have only a small number of ULDs due to the need for the CHS to be designed to handle a certain, oftentimes large number of ULDs. Also, a PDU can be susceptible to liquids, dust and damage from direct contact with ULDs and PDU rollers are typically prone to wear and tear and are treated as consumables.

BRIEF DESCRIPTION

According to an aspect of the disclosure, a cargo handling system (CHS) is provided and includes a guide tray along which an electric rail extends and a carrier movably disposable within the guide tray. The carrier includes a carrier surface, guide and contact rollers for establishing electric communication with the electric rail with the carrier movably disposed within the guide tray, drivable elements to assume retracted or extended positions at which, with the carrier movably disposed within the guide tray, the carrier surface is deployed within or above the guide tray, respectively; and a control system. The control system is configured to draw current from the electric communication between the electric rail and the contact roller and to use the current to operate the drivable elements to move the carrier along the guide tray and to control extension and retraction of the drivable elements.

In accordance with additional or alternative embodiments, the guide tray includes a base and sidewalls extending from opposite sides of the base, the electric rail extends along one of the sidewalls and the contact roller is urged to maintain contact with the electric rail.

In accordance with additional or alternative embodiments, the carrier includes first and second opposite sides, the contact roller extends outwardly from the first side and the guide rollers extend outwardly from the first and second sides.

In accordance with additional or alternative embodiments, the drivable elements include at least first and second drivable elements at first and second ends of the carrier, respectively.

In accordance with additional or alternative embodiments, each drivable element includes a wheel and a linkage that can be controlled to retract or extend the wheel.

In accordance with additional or alternative embodiments, the control system includes sensors, a motor coupled to the drivable elements and an electronic control unit (ECU) to operate the drivable elements to move the carrier along the guide tray and to control the extension and retraction of the drivable elements in accordance with at least readings of the sensors.

In accordance with additional or alternative embodiments, the sensors are arrayed in one or more groups on one or more of the carrier surface and end walls of the carrier.

In accordance with additional or alternative embodiments, the motor is configured to generate power to support operations of the drivable elements to move the carrier along the guide tray and extensions and retractions of the drivable elements.

According to an another aspect of the disclosure, a cargo handling system (CHS) is provided and includes guide trays along each of which an electric rail extends and carriers respectively movably disposable within corresponding ones of the guide trays. The carriers respectively include a carrier surface, guide and contact rollers for establishing electric communication with the corresponding electric rail with the carrier movably disposed within the corresponding guide tray, drivable elements to assume retracted or extended positions at which, with the carrier movably disposed within the corresponding guide tray, the carrier surface is deployed within or above the corresponding guide tray, respectively, and a control system. The control system is configured to draw current from the electric communication between the corresponding electric rail and the contact roller and to use the current to operate the drivable elements to move the carrier along the corresponding guide tray and to control extension and retraction of the drivable elements.

In accordance with additional or alternative embodiments, the CHS is disposed within an aircraft fuselage comprising a cargo door, the CHS further includes a doorway area in which a unit load device (ULD) is received via the cargo door and oriented to move toward a non-doorway area and lock trays interleaved with the guide trays and the guide trays and the lock trays extend from the doorway area to the non-doorway area.

In accordance with additional or alternative embodiments, each guide tray includes a base and sidewalls extending from opposite sides of the base, each electric rail extends along a corresponding one of the sidewalls and the corresponding contact roller is urged to maintain contact with the corresponding electric rail.

In accordance with additional or alternative embodiments, each carrier includes first and second opposite sides, the corresponding contact roller extends outwardly from the first side and the corresponding guide rollers extend outwardly from the first and second sides.

In accordance with additional or alternative embodiments, the drivable elements of each carrier include at least first and second drivable elements at first and second ends of the carrier, respectively.

In accordance with additional or alternative embodiments, each drivable element of each carrier includes a wheel and a linkage that can be controlled to retract or extend the wheel.

In accordance with additional or alternative embodiments, the control system of each carrier includes sensors, a motor coupled to the drivable elements and an electronic control unit (ECU) to operate the corresponding drivable elements to move the corresponding carrier along the corresponding guide tray and to control the extension and retraction of the corresponding drivable elements in accordance with at least readings of the sensors.

In accordance with additional or alternative embodiments, the sensors are arrayed in one or more groups on one or more of the corresponding carrier surface and end walls of the corresponding carrier.

In accordance with additional or alternative embodiments, the motor is configured to generate power to support operations of the corresponding drivable elements to move the corresponding carrier along the corresponding guide tray and extensions and retractions of the corresponding drivable elements.

According to another aspect of the disclosure, a method of operation of a semi-autonomous cargo handling system (CHS) is provided for use in an aircraft having doorway and non-doorway areas where a unit load device (ULD) is received in the doorway area. The method includes controlling a carrier to assume a retracted condition, driving the carrier in the retracted condition along a guide tray to a position underneath the ULD in the doorway area, controlling the carrier to assume an extended condition to lift the ULD, driving the carrier in the extended condition and the ULD from the doorway area and toward the non-doorway area and controlling the carrier to re-assume the retracted condition to lower the ULD in the non-doorway area.

In accordance with additional or alternative embodiments, the controlling and the driving of the carrier include controlling and driving multiple carriers.

In accordance with additional or alternative embodiments, the controlling and the driving include sensing a position of the carrier relative to one or more of the guide tray and the ULD These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a semi-autonomous cargo handling system (CHS) is provided and includes a cargo doorway area in which unit load devices (ULDs) are aligned to a desired orientation for movement of the ULDs along a longitudinal conveyance system and autonomous carriers. The autonomous carriers are configured to lift the ULDs to a conveyor level and to move the ULDs in the lifted condition to a desired location.

Figure 1:
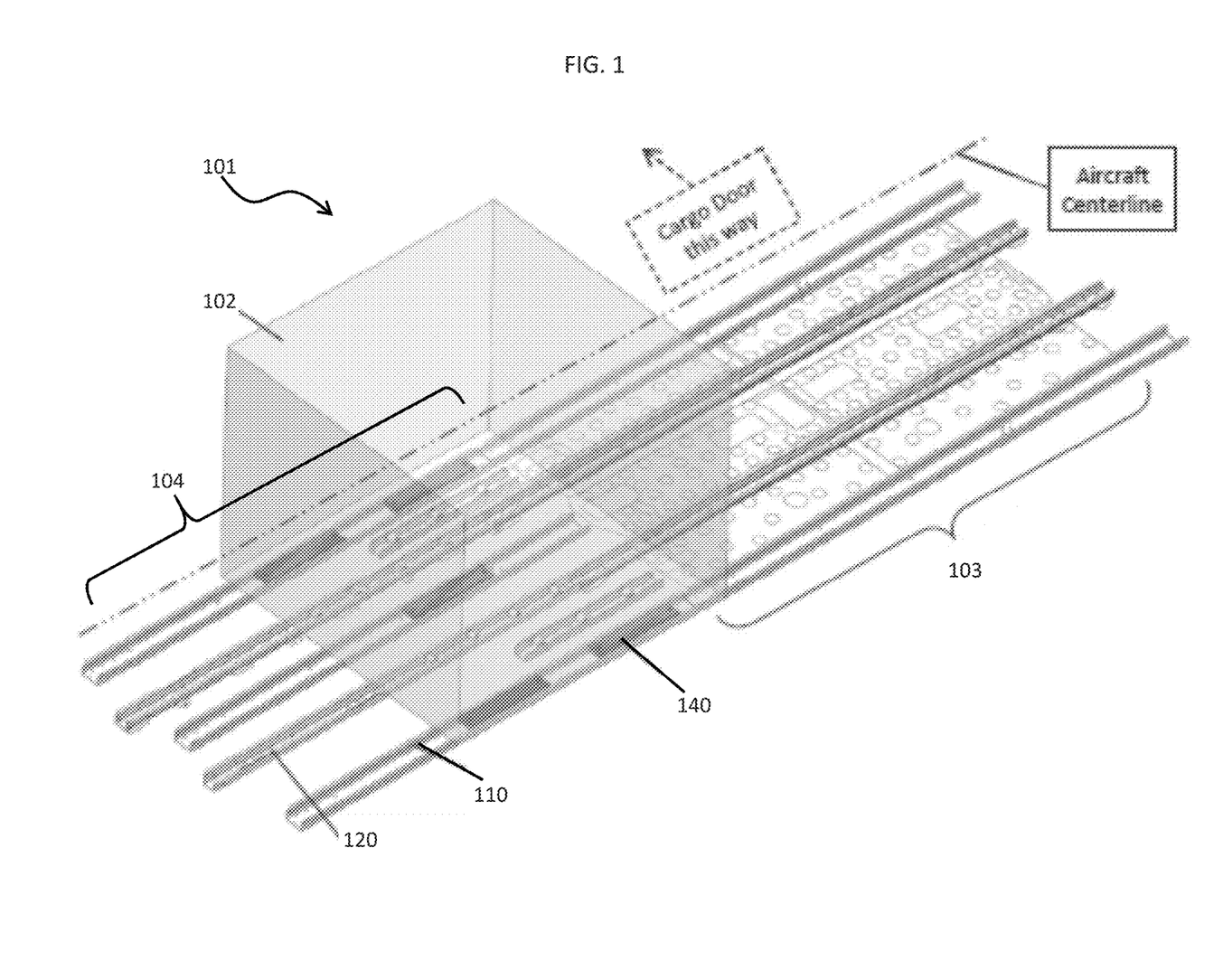
FIG. 1 is a perspective view of a cargo handling system of an aircraft in accordance with embodiments.

With reference to FIGS. 1, a CHS 101 is provided for use in an aircraft having a fuselage formed to define an interior cargo hold and a cargo door that provides access to the interior cargo hold from an exterior of the aircraft. During ground operations, luggage can be loaded into ULDs 102 that can be maneuvered around the aircraft and placed into the interior cargo hold via the cargo door. As shown in FIG. 1, the interior cargo hold can be generally divided into two areas: the doorway area 103, which is adjacent to the cargo door, the non-doorway areas 104, which are remote from both sides of the cargo door. ULDs to be loaded into the interior cargo hold are moved through the cargo door and into the doorway area 103, oriented within the doorway area 103 for movement toward the non-doorway area 104 and moved from the doorway area 103 toward the non-doorway area 104. Once the ULDs reach their assigned location in the non-doorway area 104, they can be locked in place.

Figure 2:
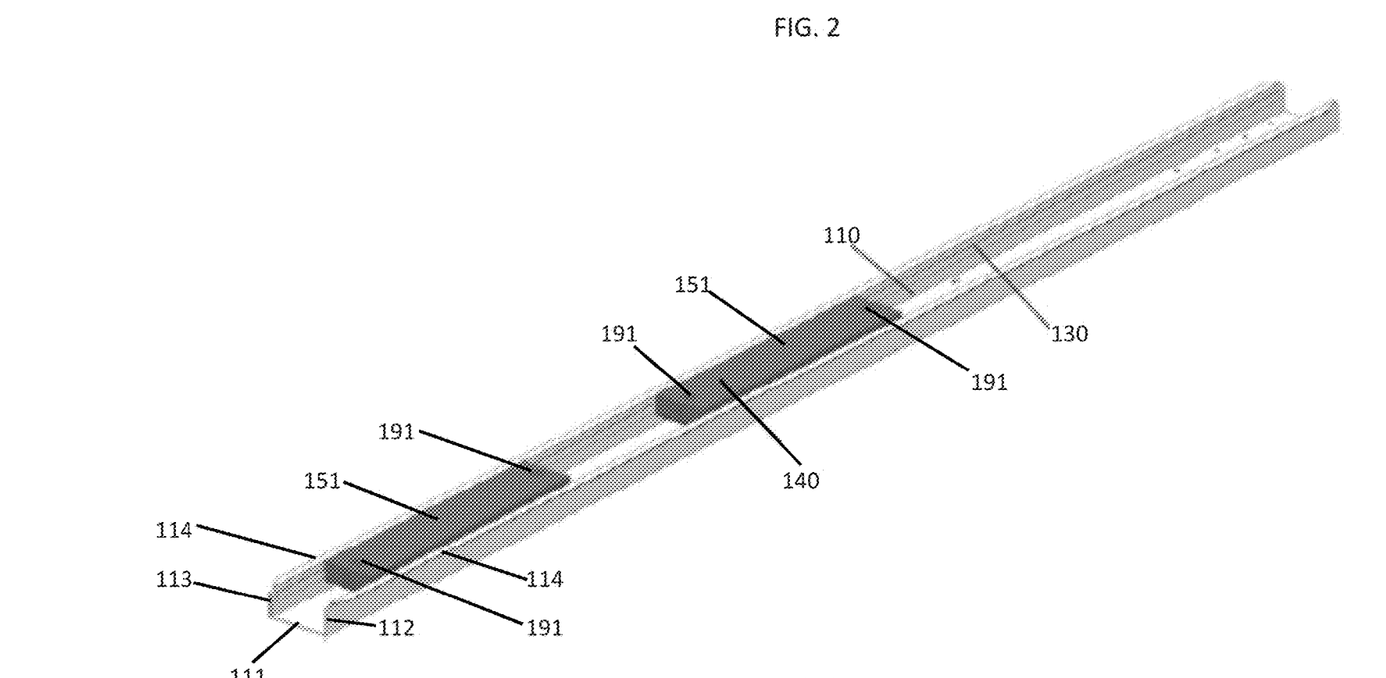
FIG. 2 is a perspective view of a carrier guide tray, a carrier and an electric current carrying rail of the cargo handling system of FIG. 1 in accordance with embodiments.
Figure 3:
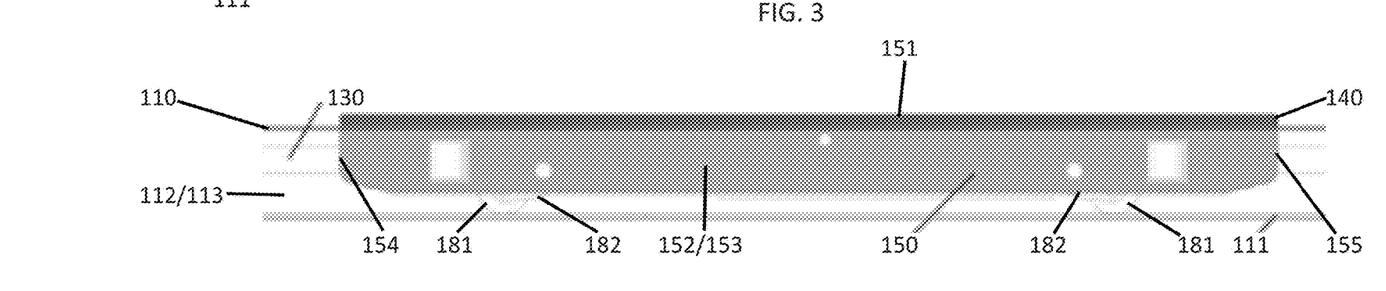
FIG. 3 is a side view of the carrier guide tray, the carrier and the electric current carrying rail of FIG. 2.

With continued reference to FIG. 1 and with additional reference to FIGS. 2 and 3, the CHS 101 includes multiple guide trays 110 and multiple lock trays 120. The multiple guide trays 110 extend in parallel with a centerline of the aircraft and the multiple lock trays 120 are interleaved with the multiple guide trays 110. Each of the multiple guide trays 110 includes a base 111 and sidewalls 112 and 113. The sidewalls 112 and 113 extend in parallel from opposite sides of the base 111 such that each guide tray 110 has a u-shaped cross-section. Each of the sidewalls 112 and 113 has an uppermost edge 114. An electric rail 130 is supported on one of the sidewalls 112 and 113 to extend along each of the multiple guide trays 110. One or more carriers 140 is provided to be movably disposable within each of the multiple guide trays 110 and along the corresponding electric rail 130.

Figure 4:
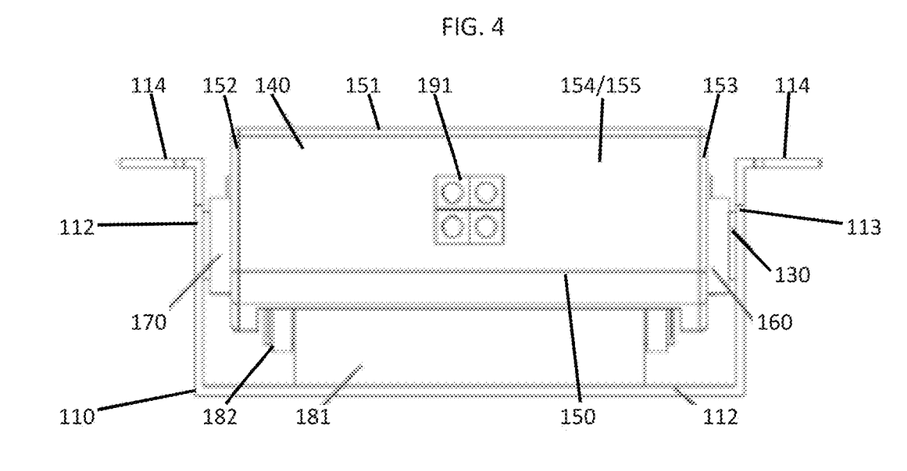
FIG. 4 is an axial view of the carrier guide tray, the carrier and the electric current carrying rail of FIG. 2.
Figure 5:
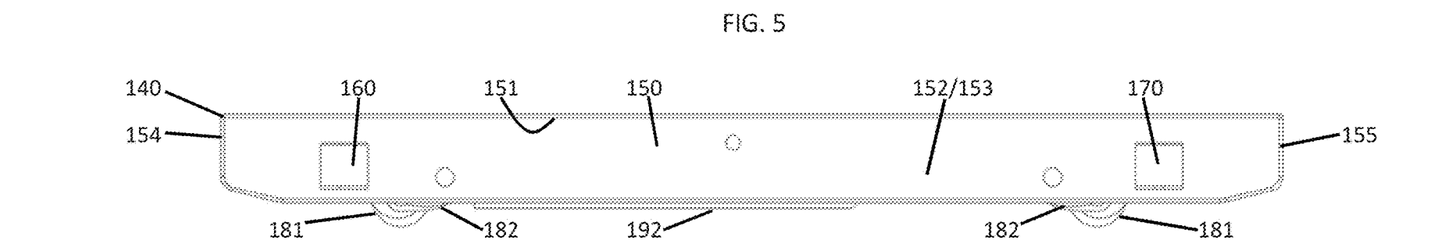
FIG. 5 is a side view of a carrier in accordance with embodiments.
Figure 6:
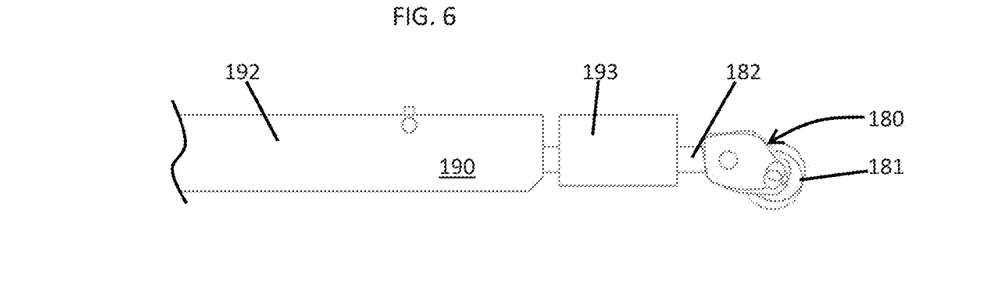
FIG. 6 is a side view of drivable elements and a control system of the carrier of FIG. 5.

With continued reference to FIGS. 2 and 3 and with additional reference to FIGS. 4-6, each carrier 140 includes a body 150 with a carrier surface 151, opposite sidewalls 152 and 153 that run along major edges of the carrier surface 151 and opposite end walls 154 and 155 that run along minor edges of the carrier surface 151, an electric contact roller (hereinafter referred to as a "contact roller") 160, a guide roller 170, drivable elements 180 and a control system 190.

The contact roller 160 can be provided as at least a first contact roller 160, which is proximate to the end wall 154 and which extends outwardly from the sidewall 153. The guide roller 170 can be provided as at least a first guide roller 170, which is proximate to the end wall 154 and which extends outwardly from the sidewall 152, and second guide rollers 170, which are proximate to the end wall 155 and which extend outwardly from the sidewalls 152 and 153 (i.e., there can be three guide rollers 170 and one contact roller 160 or other configurations). As such, when the carrier 140 is disposed within a guide tray 110, the guide rollers 170 impinge against the sidewalls 152 and 153 and the contact roller 160 is urged to impinge against the electric rail 130 on the sidewall 153. The contact roller 160 therefore establishes electric communication with the electric rail 130 with the carrier 140 movably disposed within the guide tray 110.

The drivable elements 180 can be provided as at least a first drivable element 180 proximate to the end wall 154 and a second drivable element 180 proximate to the end wall 155. Each drivable element 180 can include a wheel 181 and a linkage 182. The drivable elements 180 can be driven such that the wheel 181 rotates so as to drive movement of the carrier 140 along the guide tray 110 and the electric rail 130. In addition, the linkage 182 can be retracted or extended such that the drivable elements 180 are configured to assume retracted positions or extended positions. In the retracted positions, the wheels 181 of the drivable elements 180 are retracted into the body 150 by the linkages 182. Here, with the carrier 140 movably disposed within the guide tray 110, the carrier surface 151 is thus deployed within the guide tray 110 (i.e., a plane of the carrier surface 151 is at or below respective planes of the uppermost edges 114 of the sidewalls 112 and 113). In the extended positions, the wheels 181 of the drivable elements 180 are extended away from the body 150 by the linkages 182. Here, with the carrier 140 movably disposed within the guide tray 110, the carrier surface 151 is thus deployed above the guide tray 110 (i.e., a plane of the carrier surface 151 protrudes above the respective planes of the uppermost edges 114 of the sidewalls 112 and 113).

Figure 7:
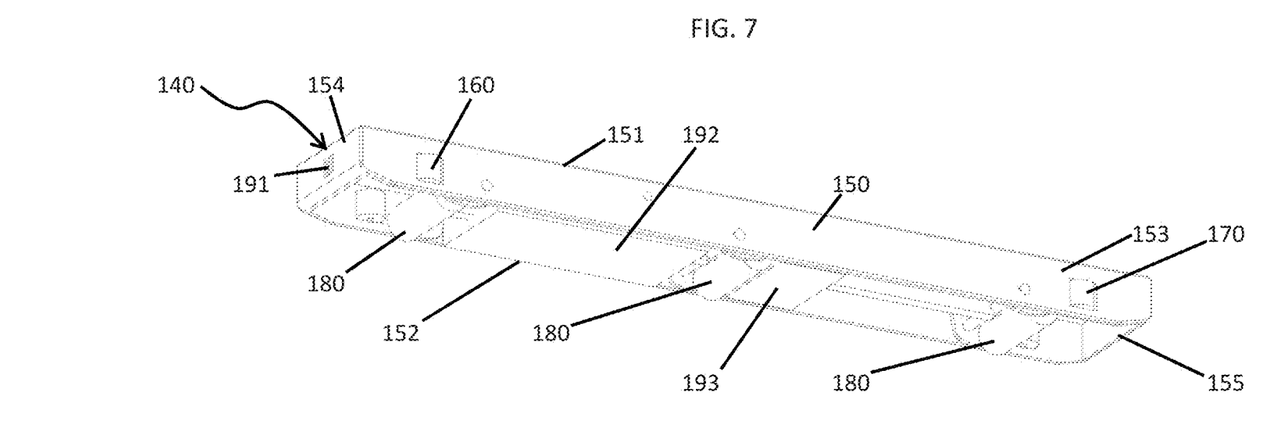
FIG. 7 is a perspective view of the carrier of FIGS. 4-6 in an extended condition in accordance with further embodiments.

With reference to FIG. 7, the body 150 can be extended in a lengthwise dimension to provide for an increased surface area of the carrier surface 151. In such cases, a number of the drivable elements 180 can also be increased so as to support a mid-section of the carrier 140.

With reference to FIGS. 2, 4, 5 and 6, the control system 190 is configured to draw current from the electric communication between the electric rail 130 and the contact roller 160 and to use the current to operate the drivable elements 180 to move the carrier 140 along the guide tray 110 and the electric rail 130 and to control the extensions and the retractions of the drivable elements 180.

In accordance with embodiments, the control system 190 includes sensors 191, a motor 192 that is coupled to the drivable elements 180 and an electronic control unit (ECU) 193. The sensors 191 can be arrayed in one or more groups of sensors 191 on one or more of the carrier surface 151 and the end walls 154 and 155. The sensors 191 can be configured to sense various conditions including, but not limited to, a position of the carrier 140 within the guide tray 110, a deployment of the carrier surface 151 within or above the guide tray 110 and a position of the carrier 140 relative to a ULD. The motor 192 is configured to generate sufficient power for the driving and the operation of the drivable elements 180. The ECU 193 is configured to operate the drivable elements 180 to move the carrier 140 along the guide tray 110 and the electric rail 130 and to control the extension and retraction of the drivable elements 180 in accordance with readings of the sensors 191.

The ECU 193 can include a processing unit, a memory unit, a servo control unit and a networking unit all of which are intercommunicative with one another via a bus and/or an input/output (I/O) unit and with the drivable elements 180 and the sensors 191. The memory has executable instructions stored thereon, which are readable and executable by the processing unit. When the executable instructions are read and executed by the processing unit, the executable instructions cause the processing unit to interpret readings of the sensors 191 and to issue instructions to the servo control unit for driving and operating the drivable elements 180 as described herein.

With the CHS 101 provided as described herein, the carriers 140 can be provided in retracted positions, positioned underneath a ULD being moved and engaged to assume extended positions. This action will lift the ULD off of whatever lower surface the ULD was seated on, such as the uppermost edges 114 of the sidewalls 112 and 113 of the guide trays 110 and the corresponding edges of the lock trays 120, such that the carriers 140 will bear the weight of the ULD. The carriers 140 will then be driven along their respective guide trays 110 to position in the lifted ULD in its assigned position. At this point, the carriers 140 will assume the retracted condition to thereby lower the ULD onto a support surface, again, such as the uppermost edges 114 of the sidewalls 112 and 113 of the guide trays 110 and the corresponding edges of the lock trays 120. The carriers 140 can then proceed back toward another ULD.

Figure 8:
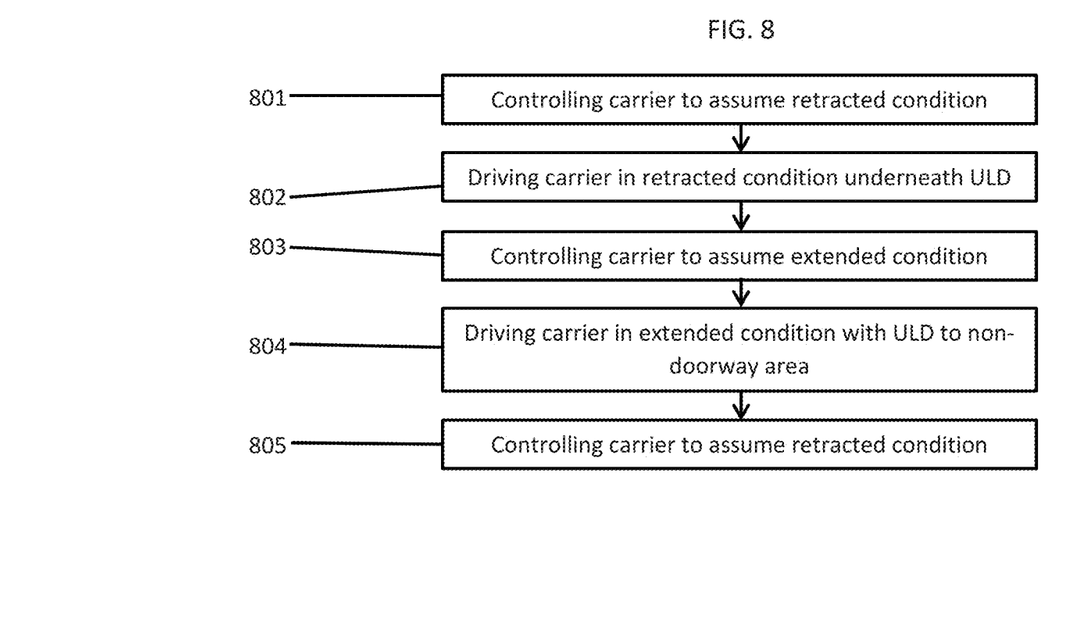
FIG. 8 is a flow diagram illustrating a method of operating a cargo holding system (CHS) in accordance with embodiments.

With reference to FIG. 8 and in accordance with another aspect of the disclosure, a method of operation of a semi-autonomous CHS is provided for use in an aircraft having the doorway and non-doorway areas 103 and 104 where a unit load device (ULD) is received in the doorway area 103. As shown in FIG. 8, the method includes activating the sensors 191 and, in accordance with readings of the sensors 191, controlling a carrier 140 to assume a retracted condition (801) and driving the carrier 140 in the retracted condition along a guide tray 110 to a position underneath the ULD in the doorway area 103 (802). At this point, the method further includes controlling the carrier 140 to assume an extended condition to lift the ULD (803), likely in concert with other carriers 140, driving the carrier 140 in the extended condition and the ULD from the doorway area 103 and toward the non-doorway area 104 (804) and controlling the carrier 140 to re-assume the retracted condition to thereby lower the ULD in the non-doorway area 104. This method can be repeated for each carrier 140 and each ULD being placed until each ULD is positioned properly in the interior cargo hold.

Technical effects and benefits of the features described herein are the provision of a semi-autonomous CHS with potential health prognostic or diagnostic capabilities. A length of the carriers of the CHS can be extended as needed to accommodate various sensors and feedback from the various sensors can be used to control movements of one or more carriers.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:
1. A cargo handling system (CHS), comprising:
   a guide tray along which an electric rail extends; and
   a carrier movably disposable within the guide tray and comprising:

a carrier surface;
guide and contact rollers for establishing electric communication with the electric rail with the carrier movably disposed within the guide tray;
drivable elements to assume retracted or extended positions at which, with the carrier movably disposed within the guide tray, the carrier surface is deployed within or above the guide tray, respectively; and
a control system configured to draw current from the electric communication between the electric rail and the contact roller and to use the current to operate the drivable elements to move the carrier along the guide tray and to control extension and retraction of the drivable elements.

2. The CHS according to claim 1, wherein:
the guide tray comprises a base and sidewalls extending from opposite sides of the base,
the electric rail extends along one of the sidewalls, and
the contact roller is urged to maintain contact with the electric rail.

3. The CHS according to claim 1, wherein:
the carrier comprises first and second opposite sides,
the contact roller extends outwardly from the first side, and
the guide rollers extend outwardly from the first and second sides.

4. The CHS according to claim 1, wherein the drivable elements comprise at least first and second drivable elements at first and second ends of the carrier, respectively.

5. The CHS according to claim 1, wherein each drivable element comprises a wheel and a linkage that can be controlled to retract or extend the wheel.

6. The CHS according to claim 1, wherein the control system comprises:
sensors;
a motor coupled to the drivable elements; and
an electronic control unit (ECU) to operate the drivable elements to move the carrier along the guide tray and to control the extension and retraction of the drivable elements in accordance with at least readings of the sensors.

7. The CHS according to claim 6, wherein the sensors are arrayed in one or more groups on one or more of the carrier surface and end walls of the carrier.

8. The CHS according to claim 6, wherein the motor is configured to generate power to support operations of the drivable elements to move the carrier along the guide tray and extensions and retractions of the drivable elements.

9. The CHS according to claim 1, wherein the control system of each carrier comprises:
sensors;
a motor coupled to the drivable elements; and
an electronic control unit (ECU) to operate the corresponding drivable elements to move the corresponding carrier along the corresponding guide tray and to control the extension and retraction of the corresponding drivable elements in accordance with at least readings of the sensors.

10. The CHS according to claim 9, wherein the sensors are arrayed in one or more groups on one or more of the corresponding carrier surface and end walls of the corresponding carrier.

11. The CHS according to claim 9, wherein the motor is configured to generate power to support operations of the corresponding drivable elements to move the corresponding carrier along the corresponding guide tray and extensions and retractions of the corresponding drivable elements.

12. A cargo handling system (CHS), comprising:
guide trays along each of which an electric rail extends; and
carriers respectively movably disposable within corresponding ones of the guide trays and comprising:
a carrier surface;
guide and contact rollers for establishing electric communication with the corresponding electric rail with the carrier movably disposed within the corresponding guide tray;
drivable elements to assume retracted or extended positions at which, with the carrier movably disposed within the corresponding guide tray, the carrier surface is deployed within or above the corresponding guide tray, respectively; and
a control system configured to draw current from the electric communication between the corresponding electric rail and the contact roller and to use the current to operate the drivable elements to move the carrier along the corresponding guide tray and to control extension and retraction of the drivable elements.

13. The CHS according to claim 12, wherein:
the CHS is disposed within an aircraft fuselage comprising a cargo door,
the CHS further comprises a doorway area in which a unit load device (ULD) is received via the cargo door and oriented to move toward a non-doorway area and lock trays interleaved with the guide trays, and
the guide trays and the lock trays extend from the doorway area to the non-doorway area.

14. The CHS according to claim 12, wherein:
each guide tray comprises a base and sidewalls extending from opposite sides of the base,
each electric rail extends along a corresponding one of the sidewalls, and
the corresponding contact roller is urged to maintain contact with the corresponding electric rail.

15. The CHS according to claim 12, wherein:
each carrier comprises first and second opposite sides,
the corresponding contact roller extends outwardly from the first side, and
the corresponding guide rollers extend outwardly from the first and second sides.

16. The CHS according to claim 12, wherein the drivable elements of each carrier comprise at least first and second drivable elements at first and second ends of the carrier, respectively.

17. The CHS according to claim 12, wherein each drivable element of each carrier comprises a wheel and a linkage that can be controlled to retract or extend the wheel.

18. A method of operation of a semi-autonomous cargo handling system (CHS) for use in an aircraft having doorway and non-doorway areas where a unit load device (ULD) is received in the doorway area, the method comprising:
controlling a carrier to assume a retracted condition;
driving the carrier in the retracted condition along a guide tray to a position underneath the ULD in the doorway area;
controlling the carrier to assume an extended condition to lift the ULD;
driving the carrier in the extended condition and the ULD from the doorway area and toward the non-doorway area; and
controlling the carrier to re-assume the retracted condition to lower the ULD in the non-doorway area.

19. The method according to claim 18, wherein the controlling and the driving of the carrier comprise controlling and driving multiple carriers.

20. The method according to claim 18, wherein the controlling and the driving comprise sensing a position of the carrier relative to one or more of the guide tray and the ULD.

* * * * *